(12) United States Patent
Mcmeekin et al.

(10) Patent No.: US 8,182,742 B2
(45) Date of Patent: May 22, 2012

(54) BEARING MATERIALS

(75) Inventors: Kenneth Macleod Mcmeekin, Ayrshire (GB); Patricia Morton McMeekin, legal representative, Troon (GB); Raymond Bridgeman, Ayrshire (GB)

(73) Assignee: Mahle International GmbH (DE)

( * ) Notice: Subject to any disclaimer, the term of this patent is extended or adjusted under 35 U.S.C. 154(b) by 358 days.

(21) Appl. No.: 12/307,681

(22) PCT Filed: Jul. 5, 2007

(86) PCT No.: PCT/GB2007/002497
§ 371 (c)(1),
(2), (4) Date: Jan. 6, 2009

(87) PCT Pub. No.: WO2008/003965
PCT Pub. Date: Jan. 10, 2008

(65) Prior Publication Data
US 2009/0297392 A1 Dec. 3, 2009

(30) Foreign Application Priority Data
Jul. 7, 2006 (GB) .................................. 0613526.3

(51) Int. Cl.
*C22C 21/00* (2006.01)
(52) U.S. Cl. ........ 420/530; 148/437; 148/438; 420/537; 420/538; 420/548; 420/551; 420/552
(58) Field of Classification Search .................. 148/437, 148/438, 535; 384/912; 420/528–530, 537, 420/538, 548, 550; 428/654
See application file for complete search history.

(56) References Cited

U.S. PATENT DOCUMENTS

| | | | | |
|---|---|---|---|---|
| 4,617,172 | A | * | 10/1986 | Mori .............................. 420/530 |
| 5,470,666 | A | | 11/1995 | Tanaka et al. |
| 2002/0034454 | A1 | * | 3/2002 | Fujita et al. ................... 420/548 |
| 2002/0068189 | A1 | | 6/2002 | Kagohara et al. |
| 2003/0102059 | A1 | | 6/2003 | Kagohara et al. |
| 2004/0247932 | A1 | | 12/2004 | Kagohara et al. |

FOREIGN PATENT DOCUMENTS

| | | |
|---|---|---|
| DE | 10149675 | 5/2002 |
| DE | 10246848 | 5/2003 |
| GB | 2066846 | 7/1981 |
| GB | 2228743 | 9/1990 |
| GB | 2271779 | 4/1994 |
| GB | 2358872 | 8/2001 |
| GB | 2367070 A | 3/2002 |
| JP | 2001140890 | 5/2001 |

OTHER PUBLICATIONS

Davis, Jr., et al., "ASM Speciality Handbook, Aluminum and Aluminum Alloys". Aluminum and Aluminum Alloys, 1993, pp. 631-635, table 13.
English abstract provided for JP-2001140890.
Germany Search Report for GB0613526.3.
EP Search report for EP 2041327.

* cited by examiner

*Primary Examiner* — Stanley Silverman
*Assistant Examiner* — Brian Walck
(74) *Attorney, Agent, or Firm* — Rader, Fishman & Grauer PLLC

(57) ABSTRACT

An aluminum-based bearing alloy material and a bearing made therefrom is described, the bearing material having a composition comprising in weight %: 5-10 tin; 0.8-1.3 copper; 0.8-1.3 nickel; 1.5-3 silicon; 0.13-0.19 vanadium; 0.8-1.2 manganese; 0.4-0.6 chromium; balance aluminum apart from incidental impurities.

20 Claims, 2 Drawing Sheets

BEARING MATERIALS

CROSS-REFERENCES TO RELATED APPLICATION

This application is a National Stage application which claims the benefit of International Application No. PCT/GB2007/002497 filed Jul. 5, 2007, which claims priority based on United Kingdom Application No. GB 0613526.3, filed Jul. 7, 2006, both of which are hereby incorporated by reference in their entirety.

The present invention relates to an aluminium-based bearing material and production of sliding bearings made from the material, particularly, though not exclusively, hydrodynamically lubricated engine crankshaft bearings.

BACKGROUND

Highly rated internal combustion engines have conventionally used crankshaft bearings comprising either a copper-based alloy or an aluminium-based bearing alloy bonded in some manner to a strong backing or substrate material such as steel, for example. The actual working surface of the bearing alloy, i.e. that surface which faces the engine crankshaft journal surface has also often been provided with a so-called overlay coating which is a thin coating of a relatively softer metal alloy such as lead-tin, lead-tin-copper or lead-indium for example. The purpose of the overlay coating is to provide conformability and dirt embeddability properties to the bearing. Conformability is that property of a bearing which allows it to accommodate slight mechanical misalignments between the bearing and shaft surfaces and is a measure of the ability of the overlay alloy to distribute the applied load. Dirt embeddability is that property which allows debris particles in the lubricating oil to be embedded in the soft overlay alloy without causing damage such as scoring of the shaft. Whilst overlay coated bearings have some technical advantages they have the significant disadvantage of being expensive to make due to the overlay generally being deposited by electroplating or sputter deposition which are relatively very labour intensive processes.

Manufacturers of motor vehicles are more frequently asking for bearings which do not have overlay coatings as they are cheaper to buy. However, some engines whilst not possessing a particularly high specific power output, due to their design, impose high loads on the crankshaft bearings or possess particularly thin oil films between the bearing and shaft journal and are consequently prone to so-called "scuffing" of the bearing surface. Scuffing is where metal to metal contact between the crankshaft journal surface and the bearing surface occurs, i.e. the oil film at the point of contact is ruptured allowing metal to metal contact. Scuffing relates to momentary metal to metal contact without actual seizure and consequent failure of the bearing. However, whilst overlay coated bearings are especially scuff resistant, most of the conventional copper and aluminium based alloys are relatively poor in terms of scuff resistance when used without an overlay. The ability to withstand scuffing is a measure of the conformability of the alloy. In contrast to scuffing, seizure is related to lack of compatibility of the alloy and generally causes failure of the bearing (and possibly of the engine) when it occurs.

GB 2 358 872, of common ownership herewith, describes aluminium-based bearing alloys for sliding bearings, principally for hydrodynamically lubricated engine bearings, comprising in weight % 5-10 tin; 0.7-1.3 copper; 0.7-1.3 nickel; 1.5-3.5 silicon; 0.1-0.3 vanadium; 0.1-0.3 manganese; balance aluminium apart from incidental impurities. This bearing alloy when bonded to a strong backing material such as steel, for example, has good fatigue strength and also exhibits superior scuff resistance when used without an overlay coating as described above and compared with other known high-strength aluminium-based bearing materials.

However, more recent developments in high output engines such as, for example, relatively small, high-revving turbo-charged diesel engines, whilst still requiring high resistance to scuffing and seizure also now require increased resistance to fatigue and wear, i.e. higher strength. However, the cost imperative is still present which precludes the use of overlay coatings. Usually, the two requirements of increased fatigue strength and maintained or increased scuffing and/or seizure resistance are mutually incompatible; higher strength usually resulting in a reduction of scuff/seizure resistance.

We have now found a formulation for an aluminium alloy-based bearing material which surprisingly satisfies the hitherto mutually incompatible requirements of increased strength and increased seizure resistance.

BRIEF SUMMARY OF THE DISCLOSURE

According to a first aspect of the present invention there is provided an aluminium-based bearing material alloy having a composition comprising in weight %: 5-10 tin; 0.8-1.3 copper; 0.8-1.3 nickel; 1.5-3.0 silicon; 0.13-0.19 vanadium; 0.8-1.2 manganese; 0.4-0.6 chromium; balance aluminium apart from incidental impurities.

Throughout this specification, the term "aluminium-based" means that the composition has aluminium as the largest single constituent therein.

In a preferred embodiment of the present invention, the tin content comprises 5.5-7.0 weight %.

Generally, when used as an engine crankshaft bearing under hydrodynamically lubricated conditions, the alloy according to the present invention may be bonded to a strong backing material, such as steel or bronze, for example. The production process for producing such material generally follows known principles of casting the basic aluminium alloy, working the cast alloy by thermo-mechanical processes to reduce its thickness to a desired size and then bonding the alloy to the strong backing material by a process such as roll pressure welding, for example.

The aluminium alloy bearing material according to the present invention when in the as-cast condition and also when processed into the final bearing lining possesses inter alia an intermetallic phase comprising MnCrV. In the cast material the phase is angular in morphology and has a maximum dimension typically of 50-100 μm. In the fully processed material the intermetallic phase is irregularly shaped, less angular and typically has a maximum dimension of 5-10 μm. The intermetallic compounds in the final alloy material when bonded to a strong backing are complex in both their composition and distribution. In the wrought alloy by rolling, for example, the intermetallic compounds have been broken down and appear in the areas of tin as elongated clusters in the rolling direction and also as discrete particles of a size as indicated above. The particles themselves are concentrations of: chromium, vanadium and manganese sometimes with silicon; silicon and manganese; and, copper and nickel.

The bearing alloy according to the present invention has, compared with the known alloy according to GB 2 358 872 described above, approximately 0.75 weight % more manganese and an additional content of 0.4-0.6 weight % chromium. This leads to a higher intrinsic strength and alloy hardness which has provided a higher fatigue strength when in bearing form. It is, therefore, very surprising that the material according to the present invention has maintained, indeed improved, its seizure resistance in the light of this. The alloy according to GB 2 358 872 had typical fatigue and seizure ratings of 91 MPa and 85 MPa, respectively whereas, the bearing alloy according to the present invention has typical fatigue and seizure ratings of 100 MPa and 90 MPa, respectively.

Frequently, the formed bearings are provided with an interlayer between the aluminium alloy and the strong backing material. Such an interlayer material in the context of the present invention may be aluminium or another aluminium alloy, for example. The interlayer may be provided as a step during processing of the cast aluminium bearing alloy such as by bonding a foil of the desired material to the aluminium alloy by a roll pressure bonding step during the thermo-mechanical working process, for example. Aluminium and aluminium alloy interlayers are well known in the bearing art and may be employed for different reasons generally related to improving or maintaining the fatigue strength of the final engine bearing. For example, where a relatively high content of a soft, low melting point metal phase such as tin is employed in the alloy composition it has been found that use of an interlayer can prevent the soft phase migrating to the bearing alloy to steel interface during high temperature operation and so reduce fatigue strength. In some cases it has been found that the material per se of the interlayer can increase the fatigue strength of the bearing.

In the present invention a preferred interlayer comprises, in effect, a two-layer interlayer interposed between the aluminium alloy bearing material and the strong backing material. An example of such an interlayer comprises a first layer adjacent the aluminium alloy bearing material of an aluminium-copper-manganese alloy and a second layer adjacent the strong backing material of an aluminium-silicon material. An example of the composition of the first layer in weight % is: Al/0.05-0.2 Cu/1-1.5 Mn; and, an example of the composition of the second layer in weight % is: Al/8 Si.

In general terms the aluminium alloy bearing material may have a thickness of about 0.25-0.35 mm in a bearing and the interlayer may have a thickness of about 0.025-035 mm in a bearing. The strong backing material may have a relatively wide range of thickness upwards from about 1 mm depending upon the engine design parameters.

According to a second aspect of the present invention there is provided an engine bearing having a lining of an aluminium-based bearing alloy material according to the first aspect of the present invention.

BRIEF DESCRIPTION OF THE DRAWINGS

In order that the present invention may be more fully understood an example will now be given by way of illustration only with reference to the accompanying drawings, of which.

DETAILED DESCRIPTION

Figure 1:
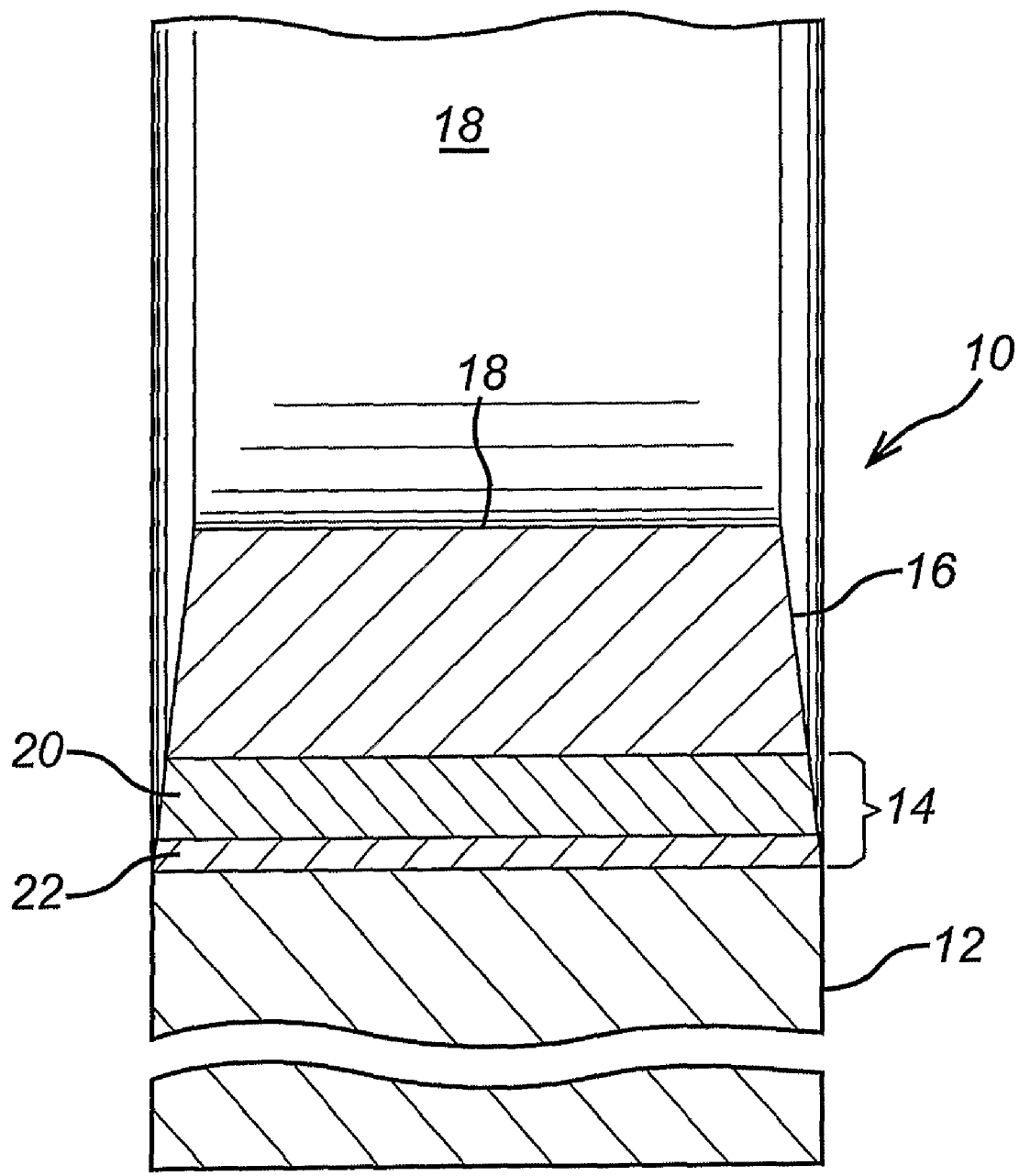
FIG. 1 shows a schematic, non-scale, axially directed cross section through a bearing having an aluminium alloy bearing material lining according to the present invention and showing the constituent layers.
Figure 2:
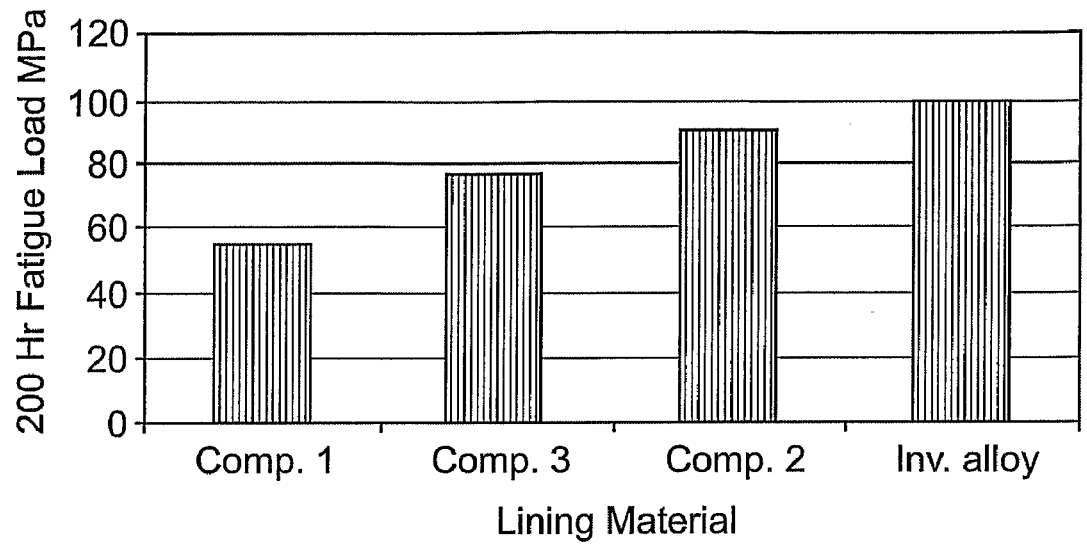
FIG. 2 shows a histogram showing fatigue strengths of bearings having an aluminium alloy lining according to the present invention and other comparative alloys.
Figure 3:
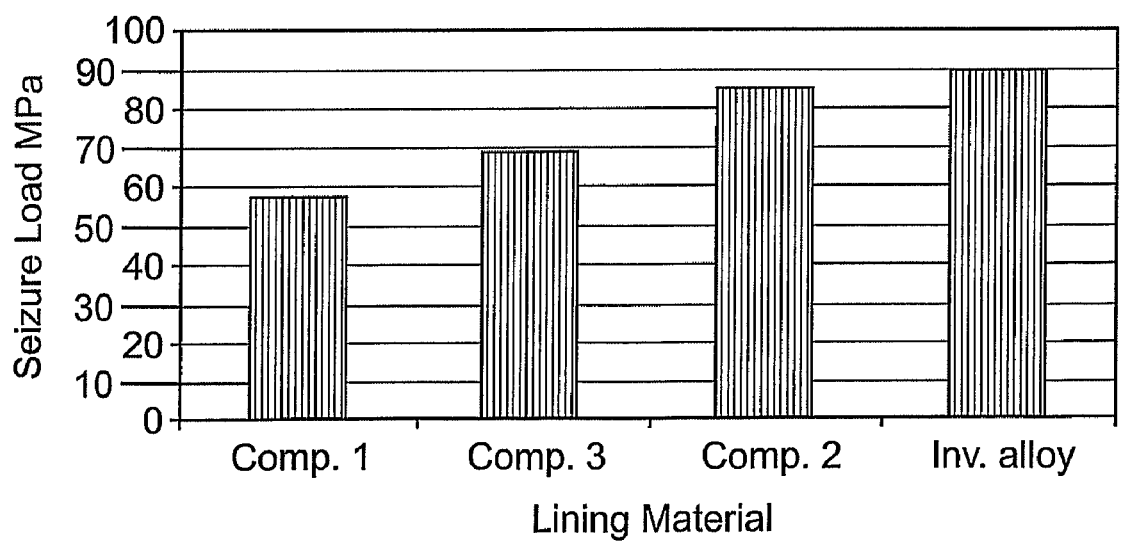
FIG. 3 which shows a histogram showing seizure resistance of bearings having an aluminium alloy lining according to the present invention and other comparative alloys.

FIG. 1 shows a schematic axial cross section through part of a typical bearing 10 having a bearing alloy lining according to the present invention. The bearing comprises a layer of a strong backing material of steel 12, an interlayer 14 and a layer of the bearing alloy lining 16 having a sliding bearing surface 18. The interlayer 14 itself comprises two layers: a first layer 20 adjacent the bearing alloy lining 16 having a composition of Al-0.1Cu-1.2Mn and constituting about 90% of the total interlayer 14 thickness; and, a second layer 22 adjacent the backing 12 having a composition Al-8% Si and constituting about 10% of the total interlayer 14 thickness.

Bearings for fatigue and seizure testing were made according to the following general procedure:

1) An alloy material having a composition in weight % of: Al-5.85Sn-1.8Si-0.8Ni-0.9Cu-0.13V-0.8Mn-0.4Cr was cast by a semi-continuous casting process;
2) The cast alloy was heat treated to homogenise at 350° C. for 4 hours;
3) The cast alloy was treated by thermo-mechanical working techniques comprising rolling and interstage annealing in several steps;
4) The rolled alloy was clad with the interlayer material by roll pressure bonding followed by several rolling and annealing steps;
5) The clad alloy was bonded to steel strip by roll pressure bonding and heat treated after the bonding step;
6) Sample bearings for testing were made by conventional techniques from the bearing alloy/steel composite strip so formed.

Test bearings were also made from other comparative prior art alloys according to a similar production process as described above according to the inventive bearing alloy. The compositions of all of the alloys tested are given below in Table 1

TABLE 1

Alloy Compositions

| Material | Composition (weight %) | | | | | | | |
|---|---|---|---|---|---|---|---|---|
| | Sn | Si | Ni | Cu | V | Mn | Cr | Al |
| Inventive Alloy | 5.85 | 1.8 | 0.8 | 0.9 | 0.13 | 0.8 | 0.4 | Bal |
| Comparative 1 | 18.0 | — | — | 1.0 | — | — | — | " |
| Comparative 2 | 6.1 | 2.15 | 1.0 | 1.0 | 0.15 | 0.23 | — | " |
| Comparative 3 | 9.9 | 2.6 | — | 1.0 | 0.2 | 0.13 | — | Bal + Ti 0.07 |

Mechanical properties of the above alloys are set out in Table 2 below.

TABLE 2

Mechanical Properties

| Material | Lining hardness (hv) | UTS (MPa) | & Elong. To fracture | Toughness * |
|---|---|---|---|---|
| Inventive alloy | 57.6 | 187 | 10.7 | 13.3 |
| Comparative alloy 1 | 34 | 117 | 18.5 | 14.4 |
| Comparative alloy 2 | 54 | 176 | 16.3 | 19.1 |
| Comparative alloy 3 | 50 | 161 | 19.1 | 20.5 |

* Where Toughness = (0.66 × UTS) × Elong./100. It is comparative rating giving a relationship between strength and ductility and has no units.

Test results relating to fatigue resistance and seizure resistance are shown below in Table 3.

TABLE 3

| | Fatigue and Seizure Resistance Results | | |
|---|---|---|---|
| Material | Sapphire L-N Fatigue 200 hr Load Capacity | Relative Sapphire scuff resistance | Relative Sapphire seizure resistance |
| Inventive alloy | 100 | No evidence of scuff | 90 |
| Comparative alloy 1 | 55 | No evidence of scuff | 58 |
| Comparative alloy 2 | 91 | No evidence of scuff | 85 |
| Comparative alloy 3 | 77 | No evidence of scuff | 69 |

From the above test data, especially in Table 3 which relates to performance parameters of the bearing material according to the present invention when in bearing form, it may be seen that the inventive alloy demonstrates surprising improvements in seizure resistance which is not generally to be expected from the higher hardness and UTS as evidenced in Table 2 above. Furthermore, the somewhat reduced elongation to fracture shown in Table 2 would also indicate, from past experience, that a deterioration in seizure resistance would be expected. Scuffing resistance has also not been compromised compared with Comparative Alloy 2 which is the subject alloy of our GB 2 358 872.

The invention claimed is:

1. An aluminum-based bearing alloy material having a composition consisting of, by weight %: 5-10 tin; 0.8-1.3 copper; 0.8-1.3 nickel; 1.5-3 silicon; 0.13-0.19 vanadium; 0.8-1.2 manganese; 0.4-0.6 chromium; balance aluminum apart from incidental impurities.

2. A bearing material according claim 1, wherein the alloy material has a distribution of intermetallic particles within the structure comprising at least an intermetallic of MnCrV.

3. A bearing material according to claim 2, wherein the size of substantially all of the intermetallic particles is less than 10 μm.

4. A bearing material according to claim 1, wherein the tin content is from 5.5 to 7 weight %.

5. A bearing material according claim 4, wherein the alloy material has a distribution of intermetallic particles within the structure comprising at least an intermetallic of MnCrV.

6. A bearing material according to claim 5, wherein the size of substantially all of the intermetallic particles is less than 10 μm.

7. A bearing with a lining having a sliding surface of an aluminum alloy-based bearing material, the bearing material consisting of:
   approximately 5-10 weight % tin;
   approximately 0.8-1.3 weight % copper;
   approximately 0.8-1.3 weight % nickel;
   approximately 1.5-3 weight % silicon;
   approximately 0.13-0.19 weight % vanadium;
   approximately 0.8-1.2 weight % manganese;
   approximately 0.4-0.6 weight % chromium; and
   the balance being aluminum apart from incidental impurities.

8. A bearing as recited in claim 7, wherein the bearing material has a distribution of intermetallic particles within the structure comprising at least an intermetallic of MnCrV.

9. A bearing as recited in claim 8, wherein the size of substantially all of the intermetallic particles is less than 10 μm.

10. A bearing as recited in claim 8, further comprising a backing material, an interlayer of aluminum-based material interposed between the lining and the backing material, wherein the backing material includes at least one of steel and copper.

11. A bearing as recited in claim 10, wherein the interlayer comprises a plurality of different aluminum alloy materials.

12. A bearing as recited in claim 7, wherein the tin content is from approximately 5.5 to 7 weight %.

13. A bearing as recited in claim 12, wherein the bearing material has a distribution of intermetallic particles within the structure comprising at least an intermetallic of MnCrV.

14. A bearing as recited in claim 13, wherein the size of substantially all of the intermetallic particles is less than 10 μm.

15. A bearing as recited in claim 14, further comprising a backing material, an interlayer of aluminum-based material interposed between the lining and the backing material, wherein the backing material includes one of steel and copper.

16. A bearing as recited in claim 15, wherein the interlayer comprises a plurality of different aluminum alloy materials.

17. A bearing as recited in claim 16, wherein the interlayer comprises at least two layers including a first layer of an aluminum-copper-manganese alloy and a second layer of an aluminum-silicon alloy.

18. A bearing as recited in claim 7, further comprising a backing material, an interlayer of aluminum-based material interposed between the lining and the backing material, wherein the backing material includes at least one of steel and copper.

19. A bearing as recited in claim 18, wherein the interlayer comprises a plurality of different aluminum alloy materials.

20. A bearing as recited in claim 19, wherein the interlayer comprises at least two layers including a first layer of an aluminum-copper-manganese alloy and a second layer of an aluminum-silicon alloy.

* * * * *